United States Patent
Khalil et al.

(10) Patent No.: US 11,929,076 B2
(45) Date of Patent: Mar. 12, 2024

(54) USER-PERCEIVED LATENCY WHILE MAINTAINING ACCURACY

(71) Applicant: Microsoft Technology Licensing, LLC, Redmond, WA (US)

(72) Inventors: Hosam Adel Khalil, Issaquah, WA (US); Emilian Stoimenov, Bellevue, WA (US); Christopher Hakan Basoglu, Everett, WA (US); Kshitiz Kumar, Redmond, WA (US); Jian Wu, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/060,949

(22) Filed: Dec. 1, 2022

(65) Prior Publication Data

US 2023/0102295 A1   Mar. 30, 2023

Related U.S. Application Data

(63) Continuation of application No. 17/123,087, filed on Dec. 15, 2020, now Pat. No. 11,532,312.

(51) Int. Cl.
| | |
|---|---|
| *G10L 15/32* | (2013.01) |
| *G10L 15/16* | (2006.01) |
| *G10L 15/30* | (2013.01) |
| *G10L 19/16* | (2013.01) |
| *G10L 25/51* | (2013.01) |
| *G10L 15/08* | (2006.01) |

(52) U.S. Cl.
CPC ............. *G10L 15/32* (2013.01); *G10L 15/16* (2013.01); *G10L 15/30* (2013.01); *G10L 19/16* (2013.01); *G10L 25/51* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 5,754,978 A * | 5/1998 | Perez-Mendez | G10L 15/32 704/239 |
| 9,761,227 B1 * | 9/2017 | Quillen | G10L 15/32 |

(Continued)

OTHER PUBLICATIONS

Amodei, et al., "Deep speech 2: End-to-end speech recognition in English and Mandarin", In Proceedings of the 33rd International Conference on Machine Learning, Jun. 11, 2016, 10 Pages.

(Continued)

*Primary Examiner* — Shaun Roberts
(74) *Attorney, Agent, or Firm* — Barta Jones, PLLC

(57) ABSTRACT

Disclosed speech recognition techniques improve user-perceived latency while maintaining accuracy by: receiving an audio stream, in parallel, by a primary (e.g., accurate) speech recognition engine (SRE) and a secondary (e.g., fast) SRE; generating, with the primary SRE, a primary result; generating, with the secondary SRE, a secondary result; appending the secondary result to a word list; and merging the primary result into the secondary result in the word list. Combining output from the primary and secondary SREs into a single decoder as described herein improves user-perceived latency while maintaining or improving accuracy, among other advantages.

20 Claims, 8 Drawing Sheets

(56) References Cited

U.S. PATENT DOCUMENTS

| | | | | |
|---|---|---|---|---|
| 2004/0059575 | A1* | 3/2004 | Brookes | G10L 15/08 704/254 |
| 2005/0065790 | A1* | 3/2005 | Yacoub | G10L 15/32 704/231 |
| 2013/0138440 | A1* | 5/2013 | Strope | G10L 15/00 704/240 |
| 2018/0314689 | A1* | 11/2018 | Wang | G10L 15/1822 |
| 2019/0341052 | A1* | 11/2019 | Allibhai | G06N 3/045 |
| 2023/0186907 | A1* | 6/2023 | Hu | G06N 3/044 704/232 |

OTHER PUBLICATIONS

Bahdanau, et al., "End-to-End Attention-Based Large Vocabulary Speech Recognition", In the Repository of arXiv:1508.04395v1, Aug. 18, 2015, 8 Pages.

Chen, et al., "Training Deep Bidirectional LSTM Acoustic Model for LVCSR by a Context-Sensitive-Chunk BPTT Approach", In Proceedings of IEEE/ACM Transactions on Audio, Speech, and Language Processing, vol. 24, Issue 7, Mar. 8, 2016, pp. 1185-1193.

Chung, et al., "Empirical Evaluation of Gated Recurrent Neural Networks on Sequence Modeling", In repository of arXiv:1412.3555v1, Dec. 11, 2014, pp. 1-9.

Dahl, et al., "Context-Dependent Pre-Trained Deep Neural Networks for Large-Vocabulary Speech Recognition", In Journal of IEEE Transactions on Audio, Speech, and Language Processing, vol. 20, Issue 1, Jan. 2012, pp. 30-42.

Deng, et al., "Recent Advances in Deep Learning for Speech Research at Microsoft", In Proceedings of IEEE International Conference on Acoustics, Speech, and Signal Processing, May 26, 2013, pp. 8604-8608.

Fiscus, Jonathan G., "A Post-Processing System to Yield Reduced Word Error Rates: Recognizer Output Voting Error Reduction (Rover)", In Proceedings of IEEE Workshop on Automatic Speech Recognition and Understanding Proceedings, Dec. 17, 1997, pp. 347-354.

Graves, et al., "Bidirectional LSTM Networks for Improved Phoneme Classification and Recognition", In Proceedings of the 15th International Conference on Artificial Neural Networks: Formal Models and their applications—Part II, Sep. 11, 2005, pp. 799-804.

Hinton, et al., "Deep Neural Networks for Acoustic Modeling in Speech Recognition: The Shared Views of Four Research Groups", In Journal of IEEE Signal Processing Magazine, vol. 29, Issue 6, Nov. 2012, pp. 82-97.

Hochreiter, et al., "Long Short-Term Memory", In Journal of Neural Computation, vol. 9, Issue 8, Nov. 15, 1997, pp. 1735-1780.

Kumar, et al., "1-D Row-Convolution LSTM: Fast Streaming ASR at Accuracy Parity with LC-BLSTM", In Interspeech, Oct. 25, 2020, pp. 2107-2111.

Kumar, et al., "Static and Dynamic State Predictions for Acoustic Model Combination", In Proceedings of IEEE International Conference on Acoustics, Speech and Signal Processing, May 12, 2019, pp. 2782-2786.

Li, et al., "Improving Layer Trajectory LSTM with Future Context Frames", In Proceedings of IEEE International Conference on Acoustics, Speech and Signal Processing, May 12, 2019, pp. 6550-6554.

Peddinti, et al., "Low latency acoustic modeling using temporal convolution and LSTMs", In Journal of IEEE Signal Processing Letters, vol. 25, Issue 3, Jul. 4, 2017, 5 Pages.

Sainath, et al., "Convolutional, Long Short-Term Memory, fully connected Deep Neural Networks", In Proceedings of IEEE International Conference on Acoustics, Speech and Signal Processing, Apr. 19, 2015, pp. 4580-4584.

Sak, et al., "Fast and Accurate Recurrent Neural Network Acoustic Models for Speech Recognition", In Repository of arXiv:1507.06947v1, Jul. 24, 2015, 5 Pages.

Sak, et al., "Long Short-Term Memory Recurrent Neural Network Architectures for Large Scale Acoustic Modeling", In Proceedings of 15th Annual Conference of the International Speech Communication Association, Sep. 14, 2014, pp. 338-342.

Sak, et al., "Recurrent Neural Aligner: An Encoder-Decoder Neural Network Model for Sequence to Sequence Mapping", In Proceedings of Interspeech, Aug. 20, 2017, pp. 1298-1302.

Schuster, et al., "Bidirectional recurrent neural networks", In Journal of IEEE Transactions on Signal Processing, vol. 45, Issue 11, Nov. 1997, pp. 2673-2681.

Seltzer, et al., "An Investigation of Deep Neural Networks for Noise Robust Speech Recognition", In Proceedings of IEEE International Conference on Acoustics, Speech and Signal Processing, May 26, 2013, pp. 7398-7402.

Xue, et al., "Improving Latency-Controlled BLSTM Acoustic Models for Online Speech Recognition", In Proceedings of IEEE International Conference on Acoustics, Speech and Signal Processing, Mar. 5, 2017, pp. 5340-5344.

* cited by examiner

USER-PERCEIVED LATENCY WHILE MAINTAINING ACCURACY

CROSS-REFERENCE TO RELATED APPLICATION

This application is a continuation application of and claims priority to U.S. patent application Ser. No. 17/123,087, entitled "USER-PERCEIVED LATENCY WHILE MAINTAINING ACCURACY," filed on Dec. 15, 2020, the disclosure of which is incorporated herein by reference in its entirety.

BACKGROUND

Speech recognition often uses look-ahead buffers for processing, in order to improve accuracy. The longer the look-ahead buffer, the later the speech recognition results appear to a user. The time difference between when a spoken word is uttered, and when it is recognized and displayed for a user, is a latency period. Long latency periods may cause the speech recognition engine (SRE) appear to be sluggish, resulting in user dissatisfaction. Shortening the look-ahead buffer, however, may negatively impact accuracy, also resulting in user dissatisfaction.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Disclosed speech recognition techniques improve user-perceived latency while maintaining accuracy at least by performing the following operations. An audio stream is received, in parallel, by a primary (e.g., accurate) speech recognition engine (SRE) and a secondary (e.g., fast) SRE. A primary result is generated with the primary SRE. A secondary result is generated with the secondary SRE. The secondary result is appended to a word list. The primary result is merged into the secondary result in the word list. Merging includes, for example, synchronizing the primary result with the secondary result; determining, within the primary result or the secondary result, whether at least some words belong to a class model; determining a word in the primary result that corresponds with a corresponding word in the secondary result; and if the corresponding word in the secondary result does not belong to a class model, replacing the corresponding word in the secondary result with the word in the primary result.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
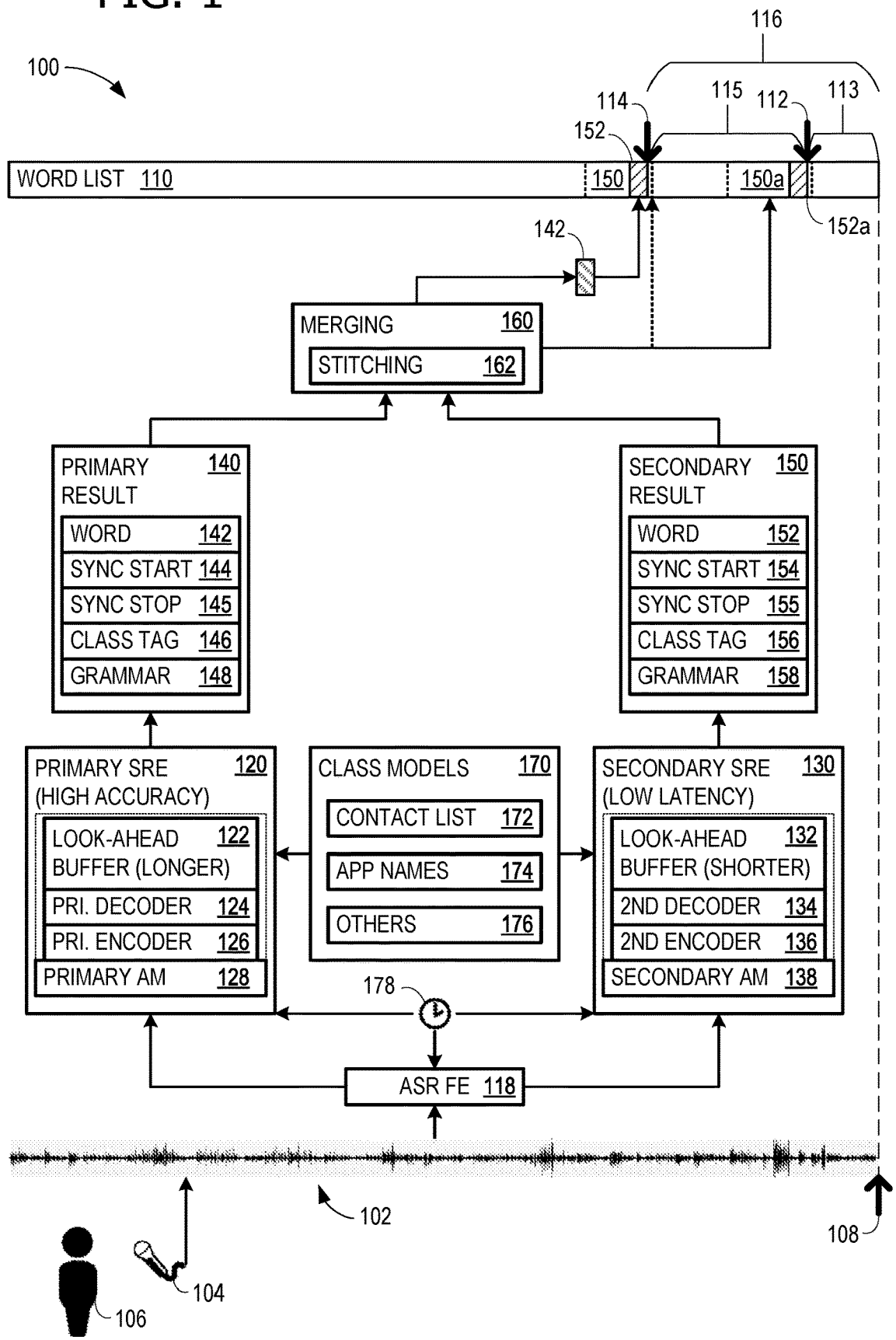
FIG. 1 illustrates an arrangement for speech recognition that advantageously improves user-perceived latency while maintaining accuracy.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Aspects of the disclosure advantageously improve the speed and accuracy of speech recognition, thus improving user-perceived latency in speech recognition while maintaining high accuracy by merging a primary (e.g., high accuracy) speech recognition engine (SRE) result into a secondary (e.g., low latency) SRE result in a word list. This high accuracy, low-latency combination provides enhanced performance over using only a high accuracy, long latency SRE or a short latency, low accuracy SRE alone. This approach eliminates the traditional trade-off between sacrificing accuracy for rapid transcription results or suffering from sluggish response in order to achieve high accuracy. Aspects of the disclosure also operate in an unconventional manner at least by replacing a corresponding word in the secondary result with a word in the primary result, based on at least determining that the corresponding word in the secondary result does not belong to a class model. As explained below, this special treatment of words found to belong to class models may further improve accuracy. The use of multiple SREs as described herein thus reduces user-perceived latency. Further, in a hybrid model example, processing speed on at least one device is increased, and model size on the device is reduced, thereby using less storage.

Multiple SREs may be operated in parallel, with the audio signal input into the SREs in a synchronized manner. A primary SRE uses a high accuracy model that may have high latency, while a secondary SRE uses a lower latency model that may have lower accuracy. During speech recognition processing, a user sees an incrementally increasing intermediate result while speaking, and then a final result when a spoken phrase is complete. The intermediate result from the secondary SRE is generated with low latency to reduce user-perceived latency, while the final result is generated from the primary SRE with higher accuracy. The final result persists for the user and, in some examples, is used for voice commands, dictation, storage, transcription, further processing, or other uses.

A merging process permits the seamless use of results from both the primary SRE and the secondary SRE, which may typically be ahead of the primary SRE in reporting results. The primary SRE results are stitched into a word list, replacing earlier-emitted words as necessary to improve accuracy, while the word list is able to grow rapidly, with low latency. Stitching is paused for words that belong to class models (e.g., words that may be checked against an external reference, such as contact list names and other common words, phrases, or names). Also, in some examples, stitching is paused across grammar models (statistical models for sequences of words). In some examples of operation, the secondary SRE emits a partial result. The partial result from the primary SRE is stored but not emitted, and the merge algorithm copies the stored primary partial result in its entirety. The merge algorithm finds the word boundary of the final word in that partial result, and appends the words from the secondary result for words whose beginning word boundary are greater or equal to the word boundary found previously. The resulting partial result is displayed to the user. Partial results are those shown in real-time, whereas final results appear when speech ceases. In some examples, merging is performed on partial results, but not final results.

Tuning for the primary and secondary SREs may be accomplished independently, providing flexibility in the trade-off between accuracy and latency. The secondary (e.g., generally faster) SRE may be application-specific, for example, with processing that favors outputting certain vocabularies (e.g., medical, financial, legal, gaming, and other specialized terminology). The secondary SRE uses a fast acoustic model (AM) and encodes sequences that include future output states, thereby generating probability distributions over senones. A senone is a cluster of shared hidden Markov model states, each of which shares an output probability distribution. For example, a single hidden Markov model (HMM) models the relationship between input audio frames and a triphone (a phoneme in context of other phonemes). An HMM has multiple states, a transition probability matrix, a start state, and an end state. Different states across the set of Markov models may share output probability distributions. Sharing an output probability distribution increases the amount of training data assigned to it, and therefore improves the robustness of its parameter estimates. Such clusters are referred to as senones. The output of a neural network (NN), for example a deep NN (DNN) in a DNN-HMM hybrid decoder includes a probability distribution for supported senones (a triplet of phones happening in a sequence). For a given input audio frame, the neural network outputs the posterior probability of the senones in a set of senones for a chosen acoustic model. The encoded sequences are sent to a decoder that decodes the sequences to output words.

The primary SRE uses an AM that may be slower, and also encodes sequences to generating probability distributions over senones. In some examples, encoded sequences from the fast AM (including the future output states) are combined with the encoded sequences from the primary SRE's AM. The jointly encoded sequences are then provided to the primary SRE decoder to output words with a higher accuracy. In some examples, the primary SRE is on a remote node across a network to take advantage of higher power processing and larger storage (e.g., in a cloud services provider network), while the secondary SRE remains local.

FIG. 1 illustrates an arrangement 100 for speech recognition that advantageously improves user-perceived latency while maintaining accuracy. An audio stream 102 is captured by a microphone 104 from a user 106. The current time in audio stream 102 is indicated by time marker 108. Arrangement 100 generates a word list 110 that may be a transcription of a live conversation (e.g., captioning for a video conference or video streaming, or for voice commands). The latest results (words or letters) in word list 110 are displayed at a time indicated by a time marker 112, which lags behind time marker 108. This results in a user-perceived latency 113. More accurate results are stitched into word list 110 at a time indicated by a time marker 114, which lags behind time marker 112 by a further time delay 115. If not for the advantageous teachings herein, the user perceived latency would be a potential latency 116, which is the combination of user-perceived latency 113 plus further time delay 115. Because user-perceived latency 113 lag is shorter than potential latency 116, the disclosure enables improving user-perceived latency while maintaining accuracy.

Audio stream 102 is input into an automatic speech recognition (ASR) feature extraction (FE) stage 118 sent in parallel to a primary SRE 120 and a secondary SRE 130. Primary SRE 120 emphasizes high accuracy at the expense of potentially higher latency (slower performance), whereas secondary SRE 130 emphasizes low latency at the expense of potentially lower accuracy. Primary SRE 120 has a look-ahead buffer 122, and secondary SRE 130 similarly has a look-ahead buffer 132, although in some examples, look-ahead buffer 122 is longer to provide higher accuracy, whereas look-ahead buffer 132 is shorter to provide higher speed.

Primary SRE 120 and secondary SRE 130 may include machine learning (ML) models, for example NNs. In some examples, primary SRE 120 and/or secondary SRE 130 use attention-based models that use an encoder network to map input acoustics into a higher-level representation, and an attention-based decoder that predicts the next output symbol (e.g., word, phrase, or letter) conditioned on a sequence of previous predictions. As illustrated, primary SRE 120 includes a primary decoder 124 and a primary encoder 126 as part of a primary AM 128, and secondary SRE 130 includes a secondary decoder 134 and a secondary encoder 136 as part of a secondary AM 138. Further detail for primary SRE 120 and secondary SRE 130, and their respective components are provided in FIGS. 3 and 5.

Primary SRE 120 generates a primary result 140 which indicates a word 142, and in some examples indicates multiple words 142, for example phrases. In some examples, primary result 140 further includes a start sync marker 144, a stop sync marker 145, a class tag 146, and a grammar tag 148. Similarly, secondary SRE 130 generates a secondary result 150 which indicates a word 152, and in some examples indicates multiple words 152, for example phrases, and/or individual letters. In some examples, secondary result 150 further includes a start sync marker 154, a stop sync marker 155, a class tag 156, and a grammar tag 158. Start sync marker 144, start sync marker 154, stop sync marker 145, and stop sync marker 155 may be based on a timer 178 that may also ensure that primary SRE 120 and secondary SRE 130 are synchronized (or separate timers are used, in some examples). In some examples, the sync markers comprise timestamps.

Class tag 146 and class tag 156 may be class start tags, class stop tags, or another type of tag indicating a class. Class tags are used, in some examples, to pause stitching, so that recognized words identified as belonging to a class model 170 are not stitched (e.g., are not changed or replaced). Class models 170 include words that may have to be checked against a reference of words that the user may be likely to use, such as names in a contact list 172, application names 174, and other words 176. Other words may be times, dates, locations (place names) and common names, such as names of celebrities or sports teams. Class models 170 may be grouped as sets of similarly-themed words. Grammar tag 148 and grammar tag 158 are used to prevent stitching across grammar models, for example stitching across different phrases. Further detail on pausing stitching within a class model or across grammar models is provided in the description of FIG. 2.

Primary result 140 and secondary result 150 are provided to merging logic 160 which merges the results to produce word list 110. Merging logic 160 contains stitching logic 162, which stitches primary result 140 into secondary result 150. In some examples, stitching occurs at the word level, rather than as partial words. In some examples, stitching also occurs at the phrase level (multiple words), and stitching across grammar models is undesirable. Further detail on merging logic 160 and stitching logic 162 is provided in relation to FIG. 7. As indicated in FIG. 1, merging logic 160 has already appended secondary result 150 to word list 110, and is stitching word 142 into word list 110 to replace word 152. This occurs because words 142 and 152 correspond, according to start sync marker 144, start sync marker 154, stop sync marker 145, and stop sync marker 155. That is, word 142 and word 152 occur at the same time.

In some examples, secondary SRE 130 is sufficiently ahead of primary SRE 120 that by the time word 142 from primary result 140 is stitched into secondary result 150 (e.g., at time marker 114), secondary SRE 130 has already generated a later secondary result 150a (with at least a word 152a), and merging logic 160 had already appended later secondary result 150a to word list 110 (e.g., at time marker 112). In some examples, primary result 140 and secondary result 150 represent different time segments within audio stream 102 and therefore different portions of word list 110. In some examples, primary result 140 and secondary result 150 nearly coincide in time. In some examples, secondary result 150 is ahead of primary result 140 by three or four words.

The tags described herein may take any form, such as markup language tags (e.g., extensible markup language tags).

Figure 2:
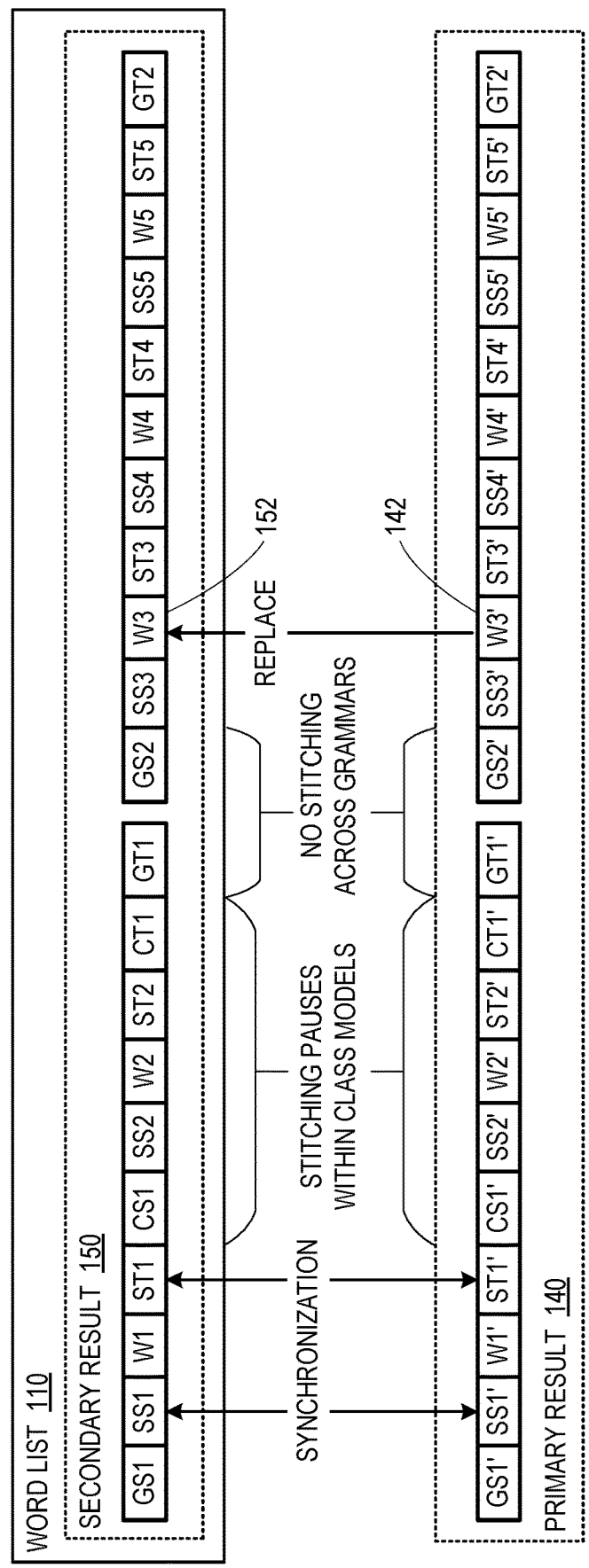
FIG. 2 illustrates further details of the arrangement of FIG. 1.

FIG. 2 illustrates further details of word list 110. As indicated, secondary result 150 is reflected within word list 110, although, in some examples, not all of the elements indicated as being within secondary result 150 are actually present within word list 110. In some examples, some of the tags are retained by merging logic 160 to identify whether to stitch in portions of primary result 140, and word list 110 contains words and a limited set of metadata (e.g., timestamps). That is, in some examples, tags are removed prior to displaying word list 110.

As an example, audio stream 102 contains "Hey, Assistant. What's the weather?" This has some notable features. "Hey Assistant" and "What's the weather?" are different phrases. These correspond to different grammar models, and so stitching may occur within "Hey Assistant" or within "What's the weather?", but not across "Assistant. What's." Additionally, Assistant is the name of an application that responds to voice commands, and thus belongs to a class model 170, specifically application names 174. For this example, both secondary SRE 130 and primary SRE 120 correctly identified two grammar models and both correctly identified "Assistant" as belonging to a grammar model. However, secondary SRE 130 improperly recognized "What's" as "Where's."

In secondary result 150, word W1 is "Hey," word W2 is "Assistant," word W3 is "Where's," word W4 is "the," and word W5 is "weather." In primary result 140, word W1' is "Hey," word W2' is "Assistant," word W3' is "What's," word W4 is "the," and word W5 is "weather." In this example, word W3' represents word 142 of FIG. 1, and word W3 represents corresponding word 152. Word W3 (word 152) "Where's" will be replaced by word W3' (word 142) "What's."

Secondary result 150 has a grammar start tag GS1 that starts the grammar model "Hey, Assistant" and a grammar stop tag GT1 that stops this grammar model. Secondary result 150 also has a grammar start tag GS2 that starts the grammar model "Where's the weather?" and a grammar stop tag GT2 that stops this grammar model. Grammar tags GT1 and GS2 will cause a pause in the stitching, so that stitching is limited to occurring between grammar tags GS1 and GT1 and also between grammar tags GS2 and GT2. Grammar tags GS1, GT1, GS2, and GT2 are examples of grammar tag 158 of FIG. 1. Primary result 140 has a grammar start tag GS1' that starts the grammar model "Hey, Assistant" and a grammar stop tag GT1' that stops this grammar model. Primary result 140 also has a grammar start tag GS2' that starts the grammar model "What's the weather?" and a grammar stop tag GT2' that stops this grammar model. Grammar tags GT1' and GS2' will cause a pause in the stitching, so that stitching is limited to occurring between grammar tags GS1' and GT1' and also between grammar tags GS2' and GT2'. Grammar tags GS1', GT1', GS2', and GT2' are examples of grammar tag 148 of FIG. 1. In some examples, stitching is paused by grammar tags in either primary result 140 or secondary result 150.

Secondary result 150 has a start sync marker SS1 and a stop sync marker ST1 for word W1, a start sync marker SS2 and a stop sync marker ST2 for word W2, a start sync marker SS3 and a stop sync marker ST3 for word W3, a start sync marker SS4 and a stop sync marker ST4 for word W4, and a start sync marker SS5 and a stop sync marker ST5 for word W5. Similarly, primary result 140 has a start sync marker SS1' and a stop sync marker ST1' for word W1', a start sync marker SS2' and a stop sync marker ST2' for word W2', a start sync marker SS3' and a stop sync marker ST3' for word W3', a start sync marker SS4' and a stop sync marker ST4' for word W4', and a start sync marker SS5' and a stop sync marker ST5' for word W5'. Start and stop sync markers mark the beginnings and ends of words, so that merging logic 160 is able to ascertain which words in primary result 140 and secondary result 150 correspond (e.g., occur in the same time windows). Start sync markers SS1-SS5 are examples of start sync marker 154, stop sync markers ST1-ST5 are examples of stop sync marker 155, start sync markers SS1'-SS5' are examples of start sync marker 144, and stop sync markers ST1'-ST5' are examples of stop sync marker 145.

In some examples, the sync markers vary slightly, so merging logic 160 will allow for some timing precision tolerance. In some scenarios, secondary SRE 130 and primary SRE 120 may interpret audio stream 102 differently, such that one recognizes two short words, whereas the other recognizes a single longer word. Deferring to the higher accuracy of primary SRE 120, with the limitation of not stitching within class models, single-versus-multiple words may be resolved using the earliest and latest sync markers, and duplicate words may also be detected and removed. In some scenarios, the (generally) more accurate primary SRE 120 recognizes an additional word. For example, secondary SRE 130 recognizes "John" and primary SRE 120 recognizes "John Smith." If both of these recognized words are outside of a class model (e.g., neither word belongs to a class model), then "Smith" will be stitched into word list 110 after "John."

Because "Assistant" belongs to class model 170, a class start tag CS1 precedes word W2, and a class stop tag CT1 follows word W2 in secondary result 150. In class models containing multiple words, class start tag CS1 will precede the initial word and class stop tag CT1 will follow the final word. When class start tag CS1 is encountered by merging logic 160, stitching is paused until after class stop tag CT1. Similarly, primary result 140 has a class start tag CS1' preceding word W2', and a class stop tag CT1' following word W2'. In some examples, a class model is detected by either primary SRE 120 or secondary SRE 130, and stitching will pause based on either class start tag CS1 or class start tag CS1'. Class tags CS1 and CT1 are examples of class tag 156, and class tags CS1' and CT1' are examples of class tag 146.

Figure 3:
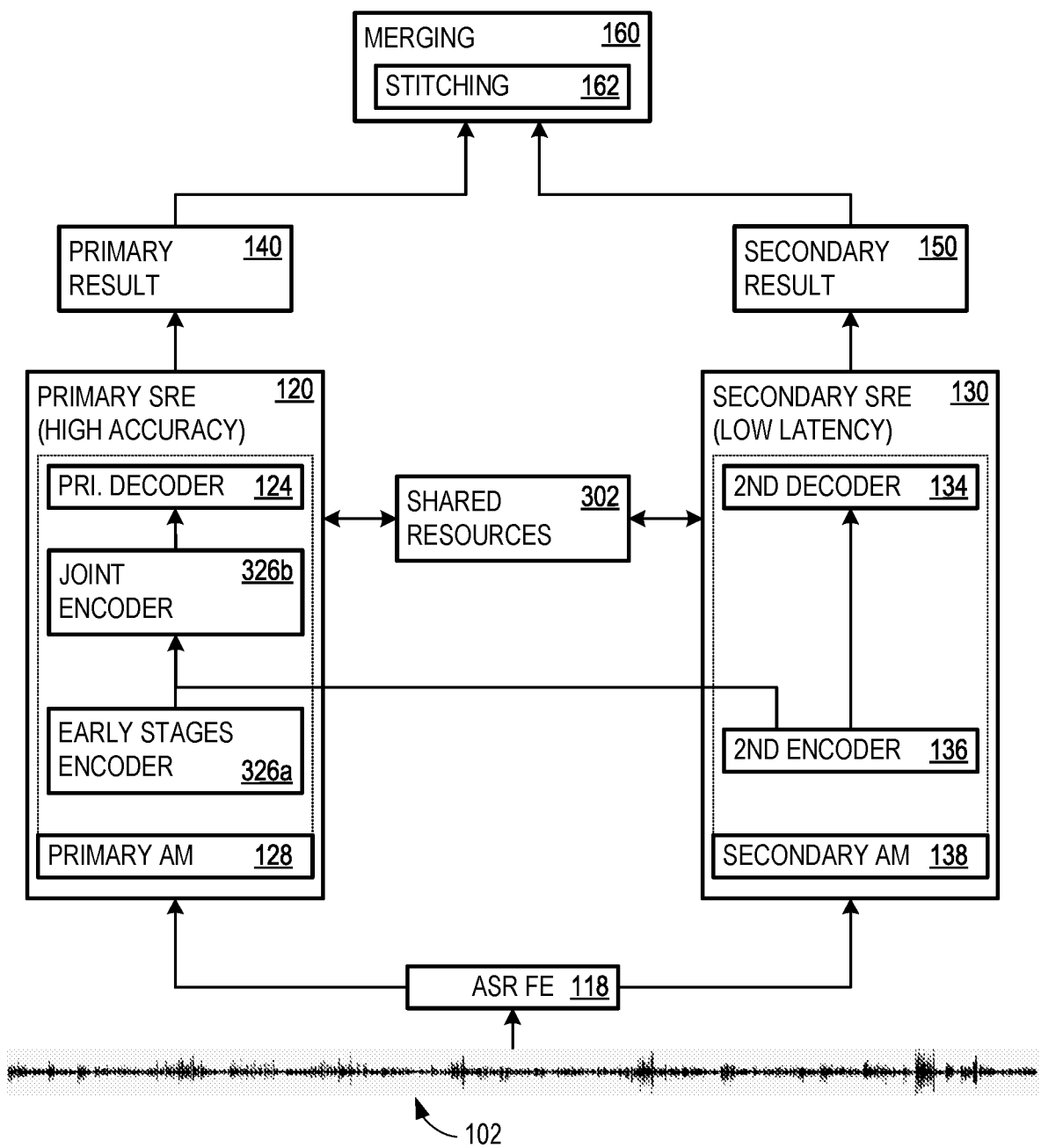
FIG. 3 illustrates further details for some examples of the arrangement of FIG. 1.

FIG. 3 illustrates further details for primary SRE 120 and secondary SRE 130, including a joint encoder 326b, as used in some examples. In some examples, primary SRE 120 uses a large primary AM 128, whereas secondary AM 138 in secondary SRE 130 is smaller and structurally simpler. In some examples, to save memory space (or other computational burdens) primary SRE 120 and secondary SRE share some resources (e.g., shared resources 302). Shared resources 302 may include memory space and even NN components. As illustrated, primary SRE includes primary decoder 124, although primary encoder 126 is shown as now having two portions: early stages encoder 326a and joint encoder 326b. Secondary encoder 136 feeds into joint encoder 326b. For primary AM 128 using encoding with six hidden layers, early stages encoder 326a may have four layers. Early stages encoder 326a produces encoded sequences (senones), and may be structurally richer than secondary encoder 136. In some examples, primary AM 128 uses a unidirectional long short-term memory (LSTM) network, a bi-directional LSTM network, or a different network architecture.

Figure 5:
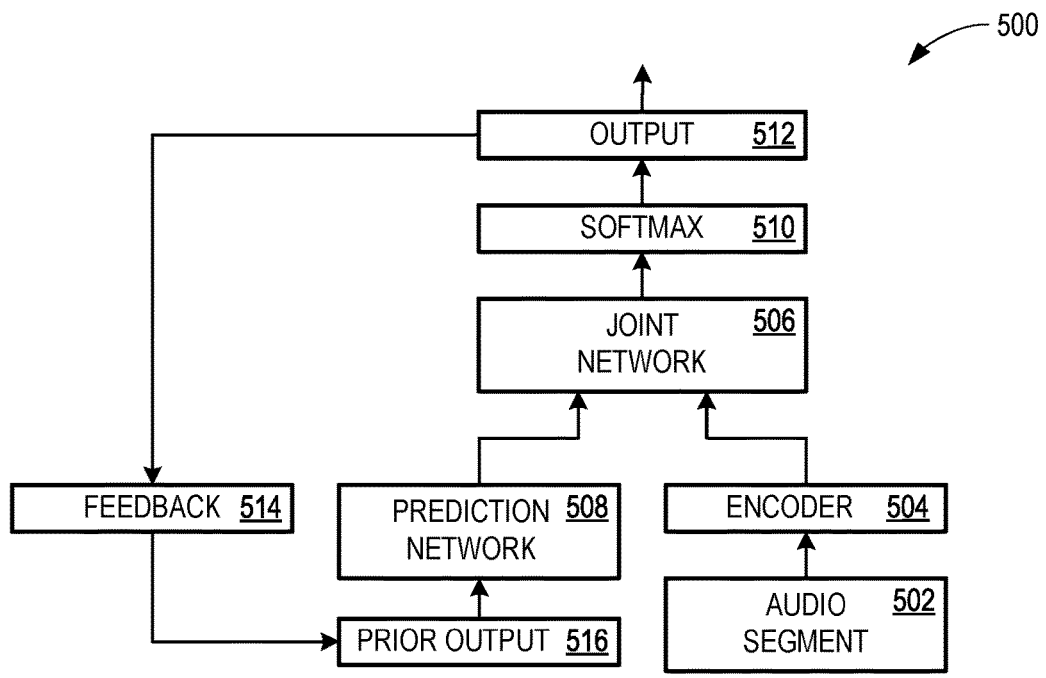
FIG. 5 illustrates an example network that may be used within the arrangement of FIG. 1.

LSTM networks are a form of a recurrent neural network (RNN) architecture that has feedback connections, and are used for classifying, processing and making predictions based on time series data, since there can be lags of unknown duration between important events in a time series. A bidirectional LSTM network uses LSTM networks going in opposite directions, one taking the input in a forward direction, and the other in a backward direction. Primary AM 128 and secondary AM 138 may have different architectures, for example, primary AM 128 uses a hybrid model and secondary AM 138 uses a recurrent neural network transducer (RNN-T) model, as shown in FIG. 5. In some examples, secondary AM 138 is one-third to one-fourth the size of primary AM 128.

In some examples, encoded output of secondary encoder 136 is provided to joint encoder 326 at one of the hidden layers. Secondary encoder 136 outputs may be ahead of early stages encoder 326a by a few frames, so secondary encoder 136 may be able to encode both its current state as well as some future output states. The secondary encoder 136 outputs may be concatenated to the early stages encoder 326a output and provided to joint encoder 326b. In some examples, joint encoder 326b performs a softmax operation, which transforms a set of inputs to values between 0 and 1 so that they can be interpreted as probabilities. In some scenarios, this joint encoding has the potential to yield more accurate speech recognition results.

In some examples, merging logic 160 and/or stitching logic 162 use rule-tree metadata to identify a sub-grammar from which each word comes, to apply additional merging restrictions and further improve user experience. Further detail on the operations of merging logic 160 and/or stitching logic 162 is provided in relation to FIG. 7.

Figure 4:
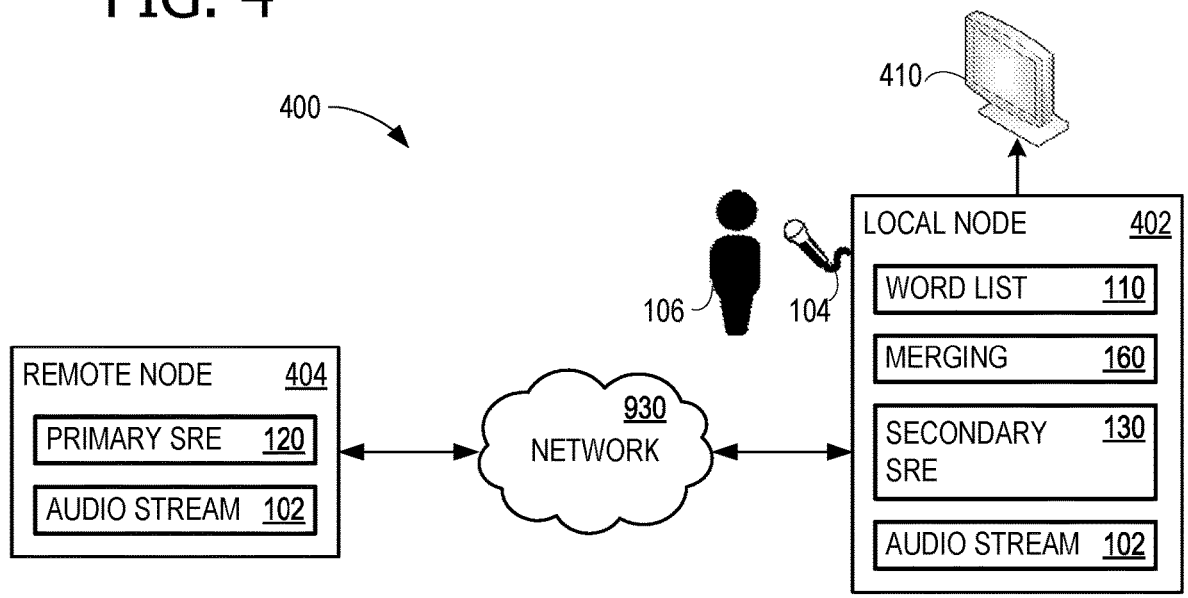
FIG. 4 also illustrates further details for some examples of the arrangement of FIG. 1.

FIG. 4 illustrates a version 400 of arrangement 100, in which user 106 is using microphone 104 to capture audio stream 102 on a local node 402 (e.g., a smartphone, tablet, personal computer (PC) or other computing apparatus) and primary SRE 120 executes on a remote node 404 across a network 930. Secondary SRE 130 remains on local node 402. In some examples, local node 402 and remote node 404 each comprises a computing device 900 of FIG. 9. Local node 402 transmits audio stream 102 to remote node 404, along with timing information for audio stream 102 (so that sync markers may be accurate) for processing by primary SRE 120. Remote node 404 returns primary result 140 for use by merging logic 160 to produce word list 110 for display in a display element 410 (e.g., a portion of presentation components 916 of FIG. 9, such as a video screen). By watching display element 410, user 106 perceives only latency 113.

Version 400 may be used when, for example, primary SRE 120 is too large or computationally burdensome to execute on local node 402. In some examples, primary SRE 120 is four or five times the size of secondary SRE 130, and demand significantly more computational power. If local node 402 is a small, portable battery-operated device, then performance of arrangement 100 may suffer if primary SRE 120 executes locally. However, in some examples of arrangement 110, primary SRE 120 and secondary SRE both reside on a single computing device (e.g., computing device 900 or local node 402), which may be a smartphone, a tablet, or a PC, such as a desktop PC or a notebook PC.

FIG. 5 illustrates an example recurrent neural network transducer (RNN-T) 500 that may be used within arrangement 100, for example within secondary SRE 130, as noted above. That is, in some examples, secondary SRE comprises RNN-T 500. RNN-T 500 processes input samples and streams output symbols, which is useful for speech dictation. In some examples, output symbols are words or alphabet characters. RNN-T 500 recognizes outputs one-by-one, as speech is received, with white spaces between words.

In operation, an audio segment 502, which is a portion of audio stream 102, is input into an encoder 504, which may be used as secondary encoder 136. A joint network 506 receives the output of encoder 504 and a prediction network 508, which makes predictions based on prior output 516. That is, prediction network 508 predicts future outputs based on current outputs, in the time reference that prior output 516 is "current" and the output of joint network 506 is the "future" output. The output of joint network 506 is subject to a softmax operation 510 which transforms a set of inputs to values between 0 and 1 so that they can be interpreted as probabilities. RNN-T 500 emits an output 512 that is copied, via a feedback loop to prior output 516 for use in the next iteration, with the next audio segment 502.

Figure 6:
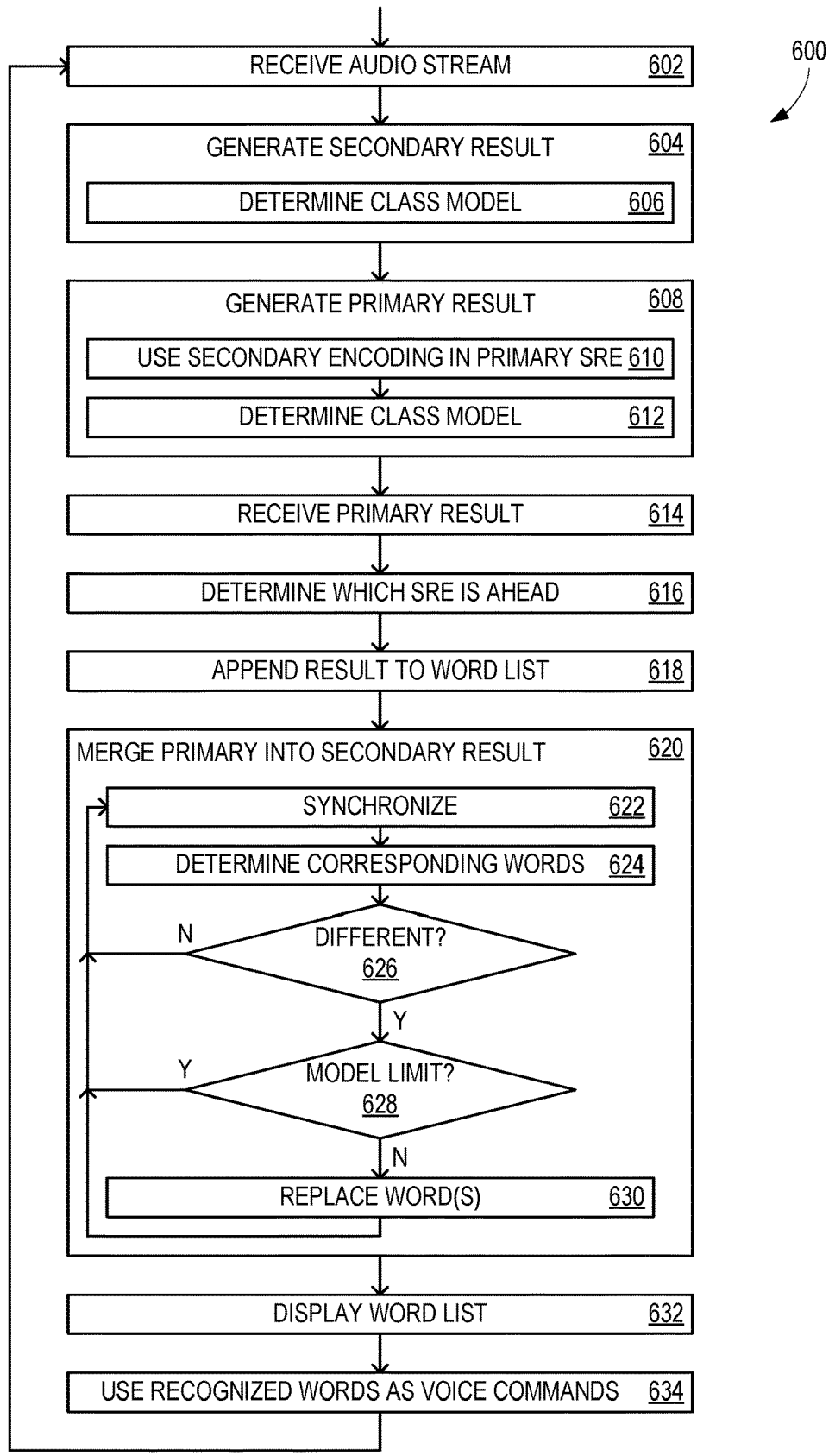
FIG. 6 is a flowchart illustrating exemplary operations associated with the arrangement of FIG. 1.

FIG. 6 is a flowchart 600 illustrating exemplary operations involved in performing speech recognition that advantageously improves user-perceived latency while maintaining accuracy. In some examples, operations described for flowchart 600 are performed by computing device 900 of FIG. 9. FIG. 6 should be viewed with FIGS. 1-5.

Flowchart 600 commences with operation 602, which includes receiving audio stream 102, in parallel, by primary SRE 120 and secondary SRE 130. In some examples, operation 602 includes receiving audio stream 102 by secondary SRE 130 on local node 402 (a computing device) and transmitting audio stream 102 to remote node 404 for processing by primary SRE 120. In some examples, timing information for audio stream 102 is also transmitted, so that sync markers may be accurate. Operation 604 includes generating, with secondary SRE 130, secondary result 150. In some examples, secondary SRE 130 comprises secondary encoder 136 and secondary decoder 134. In some examples, secondary SRE 130 comprises an ML model. In some examples, secondary SRE 130 comprises an NN. In some examples, secondary encoder 136 outputs senones with probabilities. Secondary decoder 134 outputs words (e.g., word 152). In some examples, secondary result 150 comprises an identified word 152, start sync marker 154, stop sync marker 155, and class tag 156. In some examples, the sync markers (e.g., start sync marker 154 and stop sync marker 155) comprise timestamps. In some examples, class tag 156 comprises a class start tag or a class stop tag.

Operation 606 includes determining, within secondary result 150, whether at least some words belong to class model 170, as part of operation 604 (in some examples). If so, class tags are applied before and after the words that belong to class model 170, in some examples (see FIG. 2). In some examples, class model 170 is selected from a list comprising: a contact name, a date, a time, an application name, a filename, a location, a commonly-recognized name. In some examples, a commonly-recognized name comprises a sports team name or a name of a well-known person.

Operation 608 includes generating, with primary SRE 120, primary result 140. In some examples, primary SRE 120 has a higher accuracy than secondary SRE 130, at a cost of potentially higher latency. In some examples, secondary SRE 130 has a lower latency than primary SRE 120, at a cost of potentially lower accuracy. In some examples, primary SRE 120 comprises primary encoder 126 and primary decoder 124. In some examples, primary SRE 120 comprises an ML model. In some examples, primary SRE 120 comprises an NN. In some examples, primary encoder 126 outputs senones with probability distributions. Primary decoder 124 outputs words (e.g., word 142). In some examples, primary result 140 comprises an identified word 142, start sync marker 144, stop sync marker 145, and class tag 146. In some examples, the sync markers (e.g., start sync marker 144 and stop sync marker 145) comprise timestamps. In some examples, class tag 146 comprises a class start tag or a class stop tag. In some examples, operation 608 further includes operation 610, providing encoded sequences from secondary SRE 130 into an intermediate stage of primary SRE 120 (as shown in FIG. 3).

Operation 612 includes determining, within primary result 140 whether at least some words belong to class model 170, also as part of operation 608 (in some examples). Operation 614 includes receiving primary result 140 from remote node 404 across network 930 (e.g., receiving, from remote node 404, primary result 140), when version 400 of arrangement 100 is used (e.g., primary SRE 120 resides on remote node 404 and secondary SRE 130 resides on local node 402).

Some examples of arrangement 100 append word list 110 with secondary results 150, whereas some examples of arrangement 100 append word list 110 with whichever of secondary results 150 and primary results 140 is ahead (e.g. in time). Although secondary SRE 130 may be generally faster than primary SRE 120, in some scenarios, primary SRE 120 may actually be ahead of secondary SRE 130. Thus, operation 616 includes determining whether secondary SRE 130 is ahead of primary SRE 120 or whether primary SRE 120 is ahead of secondary SRE 130. This may be accomplished using sync markers 144, 145, 154, and 155. Operation 618 includes appending results to word list 110.

In some examples, the default is appending secondary result 150 to word list 110. In some examples, operation 618 appends secondary result 150 to word list 110 when secondary result 150 is ahead of primary result 140. In such examples, appending secondary result 150 to word list 110 comprises, based on at least secondary SRE 130 being ahead of primary SRE 120, appending secondary result 150 to word list 110. In some examples, however, operation 618 includes, based on at least primary SRE 120 being ahead of secondary SRE 130, appending primary result 140 to word list 110.

Operation 620 includes merging primary result 140 into secondary result 150 in word list 110. Operation 620 comprises operations 622-628, and is an ongoing loop operation, inside of looping operations 602-634. In some examples, merging operation 620 does not occur across different grammar models. Operation 622 includes synchronizing primary result 140 with secondary result 150. In some examples, synchronizing primary result 140 with secondary result 150 comprises comparing a sync marker of primary result 140 with a sync marker of secondary result 150 (e.g., comparing start sync marker 144 with start sync marker 154, and/or comparing stop sync marker 145 with stop sync marker 155).

Operation 624 includes, based on at least the synchronizing, determining word 142 in primary result 140 that corresponds with corresponding word 152 in secondary result 150. Decision operation 626 includes determining whether word 142 in primary result 140 differs from corresponding word 152 in secondary result 150. If decision operation 626 determines that there is no difference, some examples forego stitching and proceed to the next word or grammar model. Decision operation 628 includes determining whether a class model or grammar model pauses stitching. For example, decision operation 628 includes determining, within primary result 140 or secondary result 150, whether word 142 or corresponding word 152 belongs to class model 170. Additionally, decision operation 628 may include determining whether stitching will occur within a grammar model (allowable) or across grammar classes (prohibited, in some examples). If stitching is paused, operation 620 returns to 622 or 624.

If stitching is permitted (e.g., not paused), operation 630 includes, based on at least determining that corresponding word 152 in secondary result 150 does not belong to class model 170, replacing corresponding word 152 in secondary result 150 with word 142 in primary result 140. In some examples, replacing corresponding word 152 in secondary result 150 with word 142 in primary result 140 comprises, based on at least determining that word 142 in primary result 140 differs from corresponding word 152 in secondary result 150 and determining that corresponding word 152 in secondary result 150 does not belong to class model 170, replacing corresponding word 152 in secondary result 150 with word 142 in primary result 140.

Operation 632 includes displaying word list 110, for example displaying word list 110 to user 106 on display element 410, for example as captioning for video streaming or a video conference. In some examples, word list 110 comprises at least a portion of a real-time transcription of a live conversation. Operation 634 includes using recognized words in word list 110 as voice commands. Operations 602-634 form an ongoing loop, with operation 220 looping internally.

Figure 7:
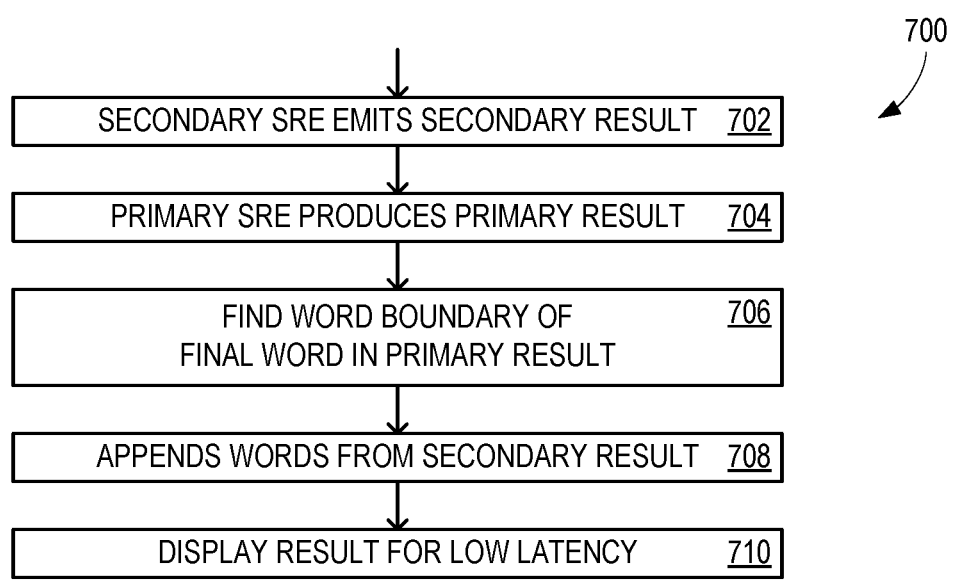
FIG. 7 is a flowchart illustrating further detail for exemplary operations associated with FIG. 6.

FIG. 7 is a flowchart 700 illustrating exemplary operations that may be used in conjunction with flowchart 600 of FIG. 6. In some examples, operations described for flowchart 700 are performed by computing device 900 of FIG. 9. Flowchart 700 commences with operation 702, in which secondary SRE 130 emits secondary result 150, which may be a partial result. In operation 704, primary SRE 120 produces primary result 140, which may also be a partial result and primary result 140 is stored. Merging logic 160 copies stored primary result 140 in operation 706, and finds the word boundary of the final word in primary result 140 (e.g., using the final stop sync marker 145). In operation 708, merging logic 160 appends the words from secondary result 150 whose beginning word boundary (e.g., the earliest start sync marker 145) is greater than or equal to the word boundary found for primary result 140 (e.g., using the final stop sync marker 145). This corresponds to operation 618 of flowchart 600. The result is displayed as word list 110 to user 106, in operation 710 (corresponding to operation 632 of flowchart 600). In some examples, merging is accomplished using partial results, rather than waiting for final results, in order to reduce latency. Merging uses sync markers (e.g., word timestamps) and may use rule-tree metadata to identify a sub-grammar from which each word comes, to apply additional merging restrictions and further improve user experience.

Figure 8:
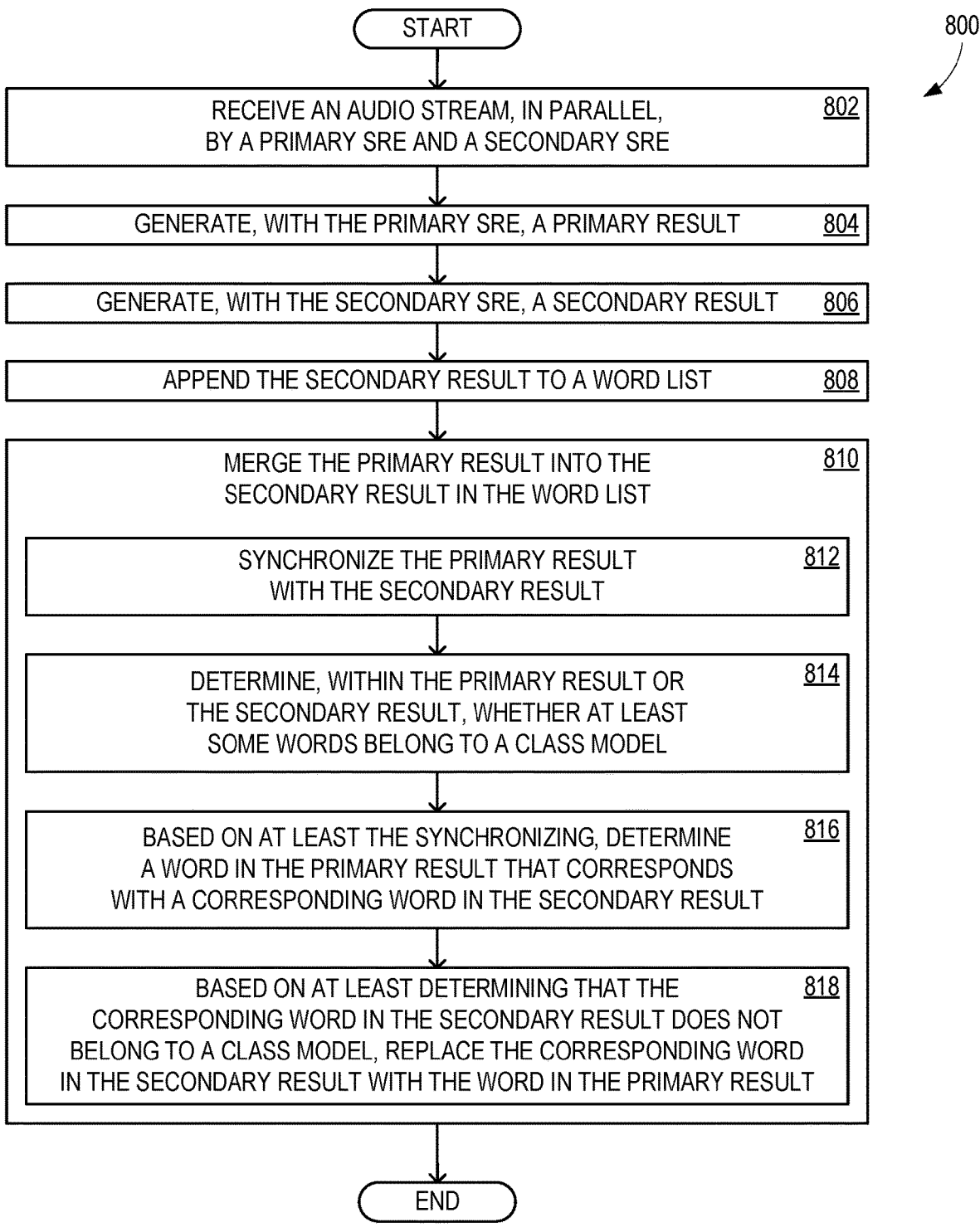
FIG. 8 is another flowchart illustrating exemplary operations associated with the arrangement of FIG. 1.

FIG. 8 is a flowchart 800 that illustrates exemplary operations involved in performing speech recognition that advantageously improves user-perceived latency while maintaining accuracy. In some examples, operations described for flowchart 800 are performed by computing device 900 of FIG. 9. Flowchart 800 commences with operation 802, which includes receiving an audio stream, in parallel, by a primary SRE and a secondary SRE. Operation 804 includes generating, with the primary SRE, a primary result. Operation 806 includes generating, with the secondary SRE, a secondary result. Operation 804 includes appending the secondary result to a word list. Operation 810 includes merging the primary result into the secondary result in the word list, which comprises operations 812-818.

Operation 812 includes synchronizing the primary result with the secondary result. Operation 814 includes determining, within the primary result or the secondary result, whether at least some words belong to a class model. Operation 816 includes, based on at least the synchronizing, determining a word in the primary result that corresponds with a corresponding word in the secondary result. Operation 818 includes, based on at least determining that the corresponding word in the secondary result does not belong to a class model, replacing the corresponding word in the secondary result with the word in the primary result.

Additional Examples

An example method of speech recognition comprises: receiving an audio stream, in parallel, by a primary SRE and a secondary SRE; generating, with the primary SRE, a primary result; generating, with the secondary SRE, a secondary result; appending the secondary result to a word list; and merging the primary result into the secondary result in the word list, wherein the merging comprises: synchronizing the primary result with the secondary result; determining, within the primary result or the secondary result, whether at least some words belong to a class model; based on at least the synchronizing, determining a word in the primary result that corresponds with a corresponding word in the secondary result; and based on at least determining that the corresponding word in the secondary result does not belong to a class model, replacing the corresponding word in the secondary result with the word in the primary result.

An example system for speech recognition comprises: a processor; and a computer-readable medium storing instructions that are operative upon execution by the processor to: receive an audio stream, in parallel, by a primary SRE and a secondary SRE; generate, with the primary SRE, a primary result; generate, with the secondary SRE, a secondary result; append the secondary result to a word list; and merge the primary result into the secondary result in the word list, wherein the merging comprises: synchronizing the primary result with the secondary result; determining, within the primary result or the secondary result, whether at least some words belong to a class model; based on at least the synchronizing, determining a word in the primary result that corresponds with a corresponding word in the secondary result; and based on at least determining that the corresponding word in the secondary result does not belong to a class model, replacing the corresponding word in the secondary result with the word in the primary result.

One or more example computer storage devices (e.g., a computing device) have computer-executable instructions stored thereon, which, on execution by a computer, cause the computer to perform operations comprising: receiving an audio stream, in parallel, by a primary speech SRE and a secondary SRE; generating, with the primary SRE, a primary result; generating, with the secondary SRE, a secondary result; appending the secondary result to a word list; and merging the primary result into the secondary result in the word list, wherein the merging comprises: synchronizing the primary result with the secondary result; determining, within the primary result or the secondary result, whether at least some words belong to a class model; based on at least the synchronizing, determining a word in the primary result that corresponds with a corresponding word in the secondary result; and based on at least determining that the corresponding word in the secondary result does not belong to a class model, replacing the corresponding word in the secondary result with the word in the primary result.

A, example computing device has computer-executable instructions stored thereon, which, on execution by a computer, cause the computer to perform operations comprising: receiving an audio stream by a secondary speech recognition engine (SRE) on the computing device; transmitting the audio stream to a remote node for processing by a primary SRE; receiving, from the remote node, a primary result; generating, with the secondary SRE, a secondary result; appending the secondary result to a word list; and merging the primary result into the secondary result in the word list, wherein the merging comprises: synchronizing the primary result with the secondary result; determining, within the primary result or the secondary result, whether at least some words belong to a class model; based on at least the synchronizing, determining a word in the primary result that corresponds with a corresponding word in the secondary result; and based on at least determining that the corresponding word in the secondary result does not belong to a class model, replacing the corresponding word in the secondary result with the word in the primary result.

Alternatively, or in addition to the other examples described herein, examples may include any combination of the following:
  the primary SRE has a higher accuracy than the secondary SRE;
  the secondary SRE has a lower latency than the primary SRE;
  displaying the word list;
  use recognized words in the word list as voice commands;

the word list comprises at least a portion of a real-time transcription of a live conversation;
receiving the primary result from a remote node across a network;
the primary SRE resides on the remote node and the secondary SRE resides on a local node;
the primary SRE and the secondary SRE both reside on a single computing device;
providing encoded sequences from the secondary SRE into an intermediate stage of the primary SRE;
synchronizing the primary result with the secondary result comprises comparing a sync marker of the primary result with a sync marker of the secondary result;
determining whether the word in the primary result differs from the corresponding word in the secondary result;
replacing the corresponding word in the secondary result with the word in the primary result comprises: based on at least determining that the word in the primary result differs from the corresponding word in the secondary result and determining that the corresponding word in the secondary result does not belong to a class model, replacing the corresponding word in the secondary result with the word in the primary result;
a class model is selected from a list comprising: a contact name, a date, a time, an application name, a filename, a location, a commonly-recognized name;
a commonly-recognized name comprises a sports team name or a name of a well-known person;
the primary result comprises an identified word, a start sync marker, a stop sync marker, and a class tag;
the secondary result comprises an identified word, a start sync marker, a stop sync marker, and a class tag;
the class tag comprises a class start tag or a class stop tag;
the merging does not occur across different grammar models;
the primary SRE comprises a primary encoder and a primary decoder;
the primary encoder outputs senones with probabilities;
the primary decoder outputs words;
the primary SRE comprises an ML model;
the primary SRE comprises an NN;
the secondary SRE comprises a secondary encoder and a secondary decoder;
the secondary encoder outputs senones with probabilities;
the secondary decoder outputs words;
the secondary SRE comprises an ML model;
the secondary SRE comprises an NN;
the secondary SRE comprises an RNN-T;
the sync markers comprise timestamps;
determining whether the secondary SRE is ahead of the primary SRE or whether the primary SRE is ahead of the secondary SRE;
appending the secondary result to the word list comprises based on at least the secondary SRE being ahead of the primary SRE, appending the secondary result to a word list; and
based on at least the primary SRE being ahead of the secondary SRE, appending the primary result to a word list.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
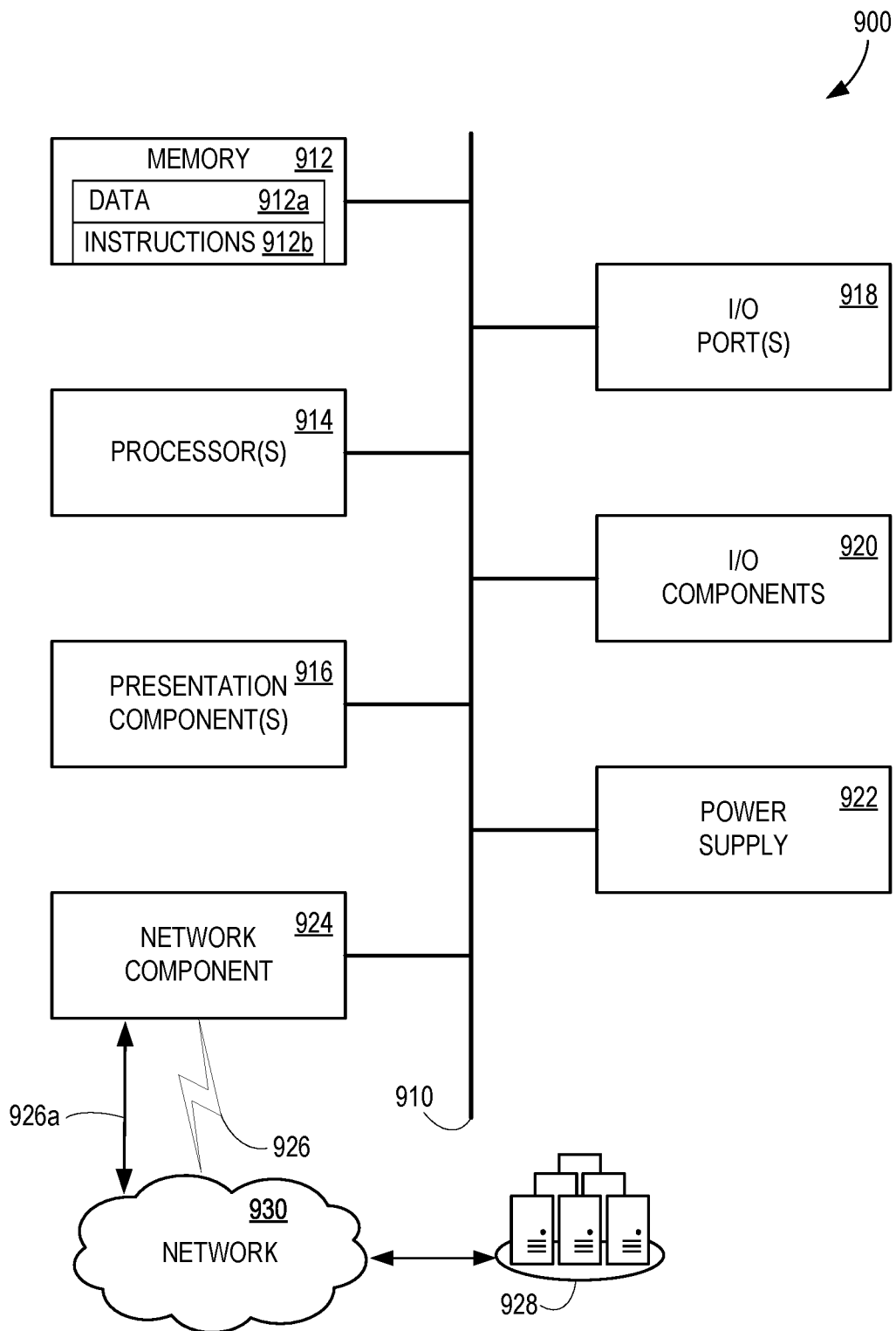
FIG. 9 is a block diagram of an example computing environment suitable for implementing some of the various examples disclosed herein.

FIG. 9 is a block diagram of an example computing device 900 for implementing aspects disclosed herein, and is designated generally as computing device 900. Computing device 900 is but one example of a suitable computing environment and is not intended to suggest any limitation as to the scope of use or functionality of the examples disclosed herein. Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer-storage memory 912, one or more processors 914, one or more presentation components 916, I/O ports 918, I/O components 920, a power supply 922, and a network component 924. While computing device 900 is depicted as a seemingly single device, multiple computing devices 900 may work together and share the depicted device resources. For example, memory 912 is distributed across multiple devices, and processor(s) 914 is housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer-storage media references below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer-storage media in the form of volatile and/or nonvolatile memory, removable or non-removable memory, data disks in virtual environments, or a combination thereof. Memory 912 may include any quantity of memory associated with or accessible by the computing device 900. Memory 912 may be internal to the computing device 900 (as shown in FIG. 9), external to the computing device 900 (not shown), or both (not shown). Examples of memory 912 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 900. Additionally, or alternatively, the memory 912 may be distributed across multiple computing devices 900, for example, in a virtualized environment in which instruction processing is carried out on multiple devices 900. For the purposes of this disclosure, "computer storage media," "computer-storage memory," "memory," and "memory devices" are synonymous terms for the computer-storage memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations are performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

The computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a cloud resource 928 across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method comprising:
   receiving an audio stream, in parallel, by a primary speech recognition engine (SRE) and a secondary SRE;
   generating a concatenated output including an encoded output of the secondary SRE and an early-stage encoded output of the primary SRE;
   processing the concatenated output by the primary SRE; and
   based upon the processing of the concatenated output by the primary SRE, generating a speech recognition result.

2. The computer-implemented method of claim 1, wherein the primary SRE uses a first acoustic model (AM) and the secondary SRE uses a second AM, wherein the second AM is faster than the first AM.

3. The computer-implemented method of claim 2, wherein the first AM uses a hybrid model and the second AM uses a recurrent neural network transducer (RNN-T) model.

4. The computer-implemented method of claim 1, wherein the speech recognition result is generated by a primary decoder included in the primary SRE.

5. The computer-implemented method of claim 1, wherein the primary SRE is on a remote node and the secondary SRE is on a local node.

6. The computer-implemented method of claim 1, wherein the primary SRE has a first look-ahead buffer and the secondary SRE has a second look-ahead buffer, wherein the first look-ahead buffer is longer than the second look-ahead buffer.

7. The computer-implemented method of claim 1, wherein the primary SRE and the secondary SRE reside on a single computing device.

8. A system comprising:
   a processor; and
   a computer-readable medium storing instructions that are operative upon execution by the processor to:
      receive an audio stream, in parallel, by a primary speech recognition engine (SRE) and a secondary SRE;
      generate a concatenated output including an encoded output of the secondary SRE and an early-stage encoded output of the primary SRE;
      process the concatenated output by the primary SRE; and
      based upon the processing of the concatenated output by the primary SRE, generate a speech recognition result.

9. The system of claim 8, wherein the primary SRE uses a first acoustic model (AM) and the secondary SRE uses a second AM, wherein the second AM is faster than the first AM.

10. The system of claim 8, wherein the primary SRE comprises an early-stage encoder, a joint encoder, and a primary decoder, wherein the secondary SRE comprises a secondary encoder and a secondary decoder, wherein the encoded output of the secondary SRE is generated by the secondary encoder and the early-stage encoded output of the primary SRE is generated by the early-stage encoder, wherein the concatenated output is provided to the joint encoder, wherein the speech recognition result is generated by the primary decoder included in the primary SRE.

11. The system of claim 8, wherein the instructions are further operative to:
   based on the speech recognition result, display a word list as captioning for a streaming video, captioning for a video conference, or a real-time transcription of a live conversation.

12. The system of claim 8, wherein the primary SRE is on a first node and the secondary SRE is on a second node, wherein the first node is different from the second node.

13. The system of claim 8, wherein the primary SRE has a first look-ahead buffer and the secondary SRE has a second look-ahead buffer, wherein the first look-ahead buffer is longer than the second look-ahead buffer.

14. The system of claim 8, wherein the primary SRE and the secondary SRE reside on a single computing device.

15. A computer storage medium having computer-executable instructions stored thereon, which, on execution by a processor, cause the processor to perform operations comprising:
   receiving an audio stream, in parallel, by a primary speech recognition engine (SRE) and a secondary SRE;
   generating a concatenated output including an encoded output of the secondary SRE and an early-stage encoded output of the primary SRE;
   processing the concatenated output by the primary SRE; and
   based upon the processing of the concatenated output by the primary SRE, generating a speech recognition result.

16. The computer storage medium of claim 15, wherein the primary SRE uses a first acoustic model (AM) and the secondary SRE uses a second AM, wherein the second AM is faster than the first AM.

17. The computer storage medium of claim 16, wherein the first AM uses a hybrid model and the second AM uses a recurrent neural network transducer (RNN-T) model.

18. The computer storage medium of claim 15, wherein the speech recognition result is generated by a primary decoder included in the primary SRE.

19. The computer storage medium of claim 15, wherein the primary SRE is on a first node and the secondary SRE is on a second node, wherein the first node is different from the second node.

20. The computer storage medium of claim 15, wherein the primary SRE has a first look-ahead buffer and the secondary SRE has a second look-ahead buffer, wherein the first look-ahead buffer is longer than the second look-ahead buffer.

\* \* \* \* \*